United States Patent
Chen et al.

(10) Patent No.: US 10,138,987 B2
(45) Date of Patent: Nov. 27, 2018

(54) SPEED REDUCER AND SERVER USING SAME

(71) Applicant: TRICORE CORPORATION, Taichung (TW)

(72) Inventors: Yen-Fu Chen, Taichung (TW); Chien-Min Huang, Taichung (TW); Chun-Han Chen, Taichung (TW)

(73) Assignee: TRICORE CORPORATION, Taichung (TW)

( * ) Notice: Subject to any disclaimer, the term of this patent is extended or adjusted under 35 U.S.C. 154(b) by 224 days.

(21) Appl. No.: 15/138,587

(22) Filed: Apr. 26, 2016

(65) Prior Publication Data
US 2017/0175862 A1 Jun. 22, 2017

(30) Foreign Application Priority Data
Dec. 16, 2015 (TW) ............................. 104220203 U

(51) Int. Cl.
| | |
|---|---|
| F16H 37/04 | (2006.01) |
| F16H 57/02 | (2012.01) |
| F16H 1/28 | (2006.01) |
| F16H 1/46 | (2006.01) |
| H02K 7/116 | (2006.01) |

(52) U.S. Cl.
CPC ............. *F16H 37/041* (2013.01); *F16H 1/28* (2013.01); *F16H 1/46* (2013.01); *F16H 57/02* (2013.01); *H02K 7/116* (2013.01); *F16H 2037/047* (2013.01); *F16H 2057/02034* (2013.01)

(58) Field of Classification Search
CPC ..... F16H 2057/02034; F16H 2037/047; F16H 37/041; F16H 1/28; F16H 1/46; F16H 57/02; F16H 3/72
See application file for complete search history.

(56) References Cited

U.S. PATENT DOCUMENTS

| | | | | |
|---|---|---|---|---|
| 2,950,635 | A * | 8/1960 | Bieger | F16H 3/02 310/99 |
| 5,584,207 | A * | 12/1996 | Paul | B66D 3/20 254/342 |
| 6,461,265 | B1 * | 10/2002 | Graham | F16H 3/724 475/5 |

(Continued)

*Primary Examiner* — Jacob S. Scott
*Assistant Examiner* — Lillian T Nguyen
(74) *Attorney, Agent, or Firm* — Muncy, Geissler, Olds & Lowe, P.C.

(57) ABSTRACT

A speed reducer used in a server is disclosed to include a first planetary gear set, a planet gear carrier, an internal gear surrounding the first planetary gear set, and an output gear. The first planet gear includes a first sun gear mounted on the motor output shaft, at least one first planet gear pivotally coupled at the first planet gear carrier and meshed with the first sun gear and the internal gear for driving the first planet gear carrier and the output gear to rotate. Thus, the first planetary gear set reduces the revolving speed of the rotary driving force outputted by the motor output shaft, and effectively transfer the rotary driving force to the output gear, achieving the advantages of low backlash and long service life, reducing power transfer loss, increasing server output torque, and providing high speed ratio, high design flexibility and high assembly yields.

10 Claims, 3 Drawing Sheets

(56) References Cited

U.S. PATENT DOCUMENTS

| | | | | |
|---|---|---|---|---|
| 7,628,727 | B2* | 12/2009 | Nagai | F16H 3/005 |
| | | | | 475/291 |
| 2005/0046290 | A1* | 3/2005 | Baukholt | F16H 1/46 |
| | | | | 310/75 R |
| 2014/0020491 | A1* | 1/2014 | Palfenier | H02K 29/08 |
| | | | | 74/421 A |
| 2014/0166413 | A1* | 6/2014 | Giering | B60T 13/741 |
| | | | | 188/156 |
| 2014/0298939 | A1* | 10/2014 | Kim | B25J 9/1025 |
| | | | | 74/411.5 |
| 2015/0377323 | A1* | 12/2015 | Koike | F16H 1/46 |
| | | | | 475/149 |

* cited by examiner

SPEED REDUCER AND SERVER USING SAME

BACKGROUND OF THE INVENTION

1. Field of the Invention

The present invention relates to speed reducer technology for power transfer, and more particularly, to a speed reducer with the planet gears coupled between a motor output shaft and a power output shaft of a server and arranged in a coaxial relationship with the motor output shaft, for providing the advantages of small dimension and high speed ratio and simultaneously reducing backlash and increasing production yields.

2. Description of the Related Art

Server is often used in a variety of automated devices to provide power for a specific function. It is mainly mounted at the site that needs accurate angular positioning control. Therefore, server is not only widely used in electronic products but also used in robot industry as a key component.

A conventional server generally includes a motor, a power output shaft, and a speed reducer consisting of a plurality of reducing gears. The speed reducer is coupled between an output shaft of the motor and the power output shaft to provide a speed reducing function during a power transmission. However, conventional speed reducers commonly have the drawback of the presence of excessive backlash between different reducing gears, leading to extra power loss during the power transmission, which also causes defective assembly and labor consuming and leads to increase the manufacturing cost. Therefore, an improvement in this regard is necessary.

SUMMARY OF THE INVENTION

The present invention has been accomplished under the circumstances in view. It is the main object of the present invention to provide a speed reducer and a server using the speed reducer, which significantly reduces backlashes and improves production yields.

To achieve this and other objects of the present invention, a speed reducer driven by a motor output shaft includes a first planetary gear set, an internal gear and an output gear. The first planetary gear set includes a first sun gear mounted on the motor output shaft, a first planet gear carrier, and at least one first planet gear pivotally coupled to the first planet gear carrier and meshed with the first sun gear. The internal gear surrounds the first planetary gear set and meshes with the first planet gear. The output gear couples to the internal gear and is driven by the first planet gear carrier.

To achieve this and other objects of the present invention, a server includes the aforesaid speed reducer, a housing, and a power output shaft. The motor output shaft protrudes out of the housing. The power output shaft is pivotally coupled in the housing. The speed reducer is coupled between the motor output shaft and the power output shaft for power transmission therebetween.

Thus, the speed reducer, driven by the motor output shaft, reduces the revolving speed via the first planetary gear set, transfers the rotary driving force to the output gear accurately, and controls the power output shaft of the server in the end. The power transfer loss is reduced thereby to maintain the server output torque, low backlashes are capable of being served thereto for long service life, and high speed ratio, high design capacity and high assembly yields are provided accordingly.

Other advantages and features of the present invention will be fully understood by reference to the following specification in conjunction with the accompanying drawings, in which like reference signs denote like components of structure.

DETAILED DESCRIPTION OF THE INVENTION

Figure 1:
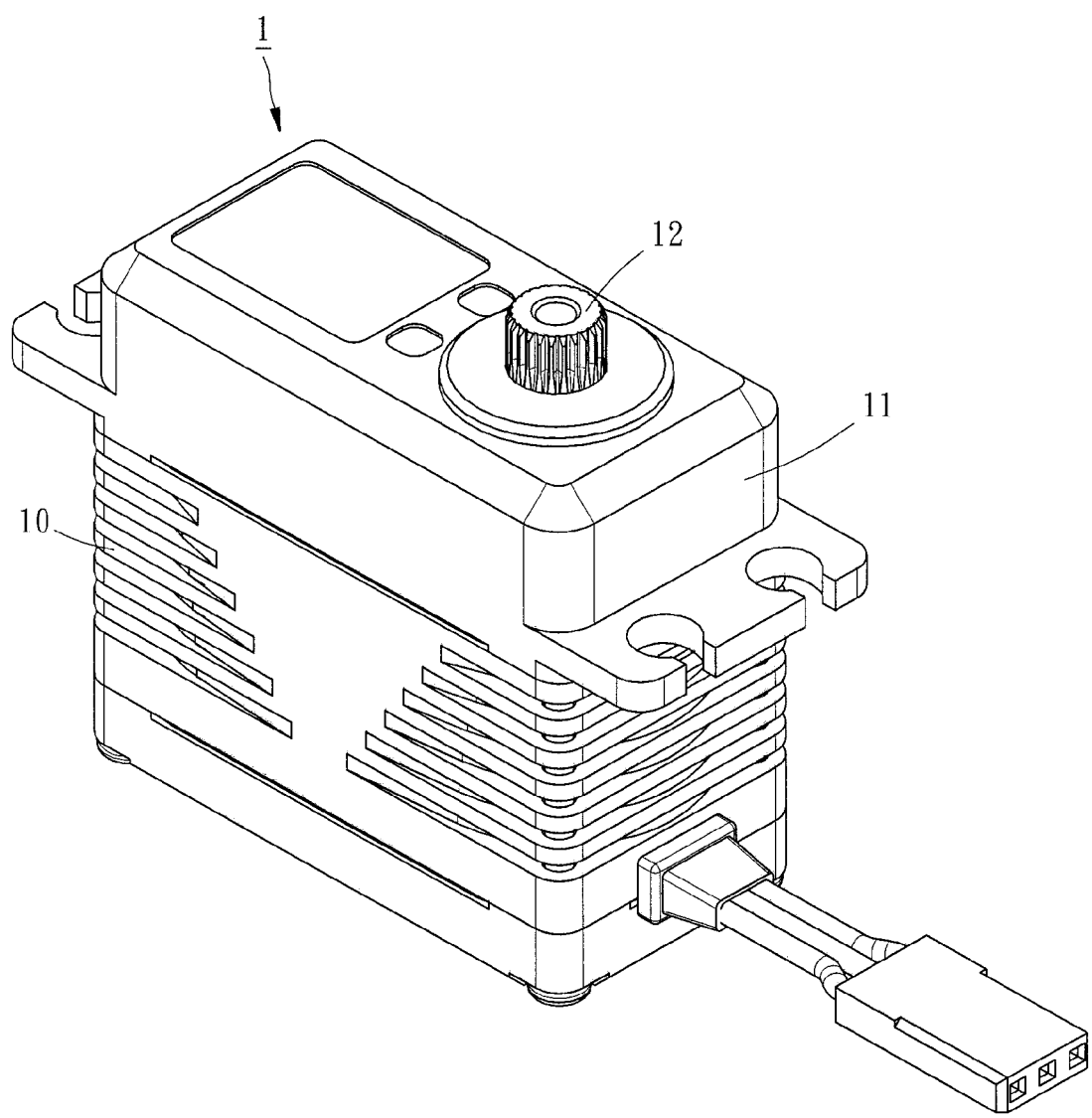
FIG. 1 is an oblique top elevational view of a server in accordance with the present invention.
Figure 2:
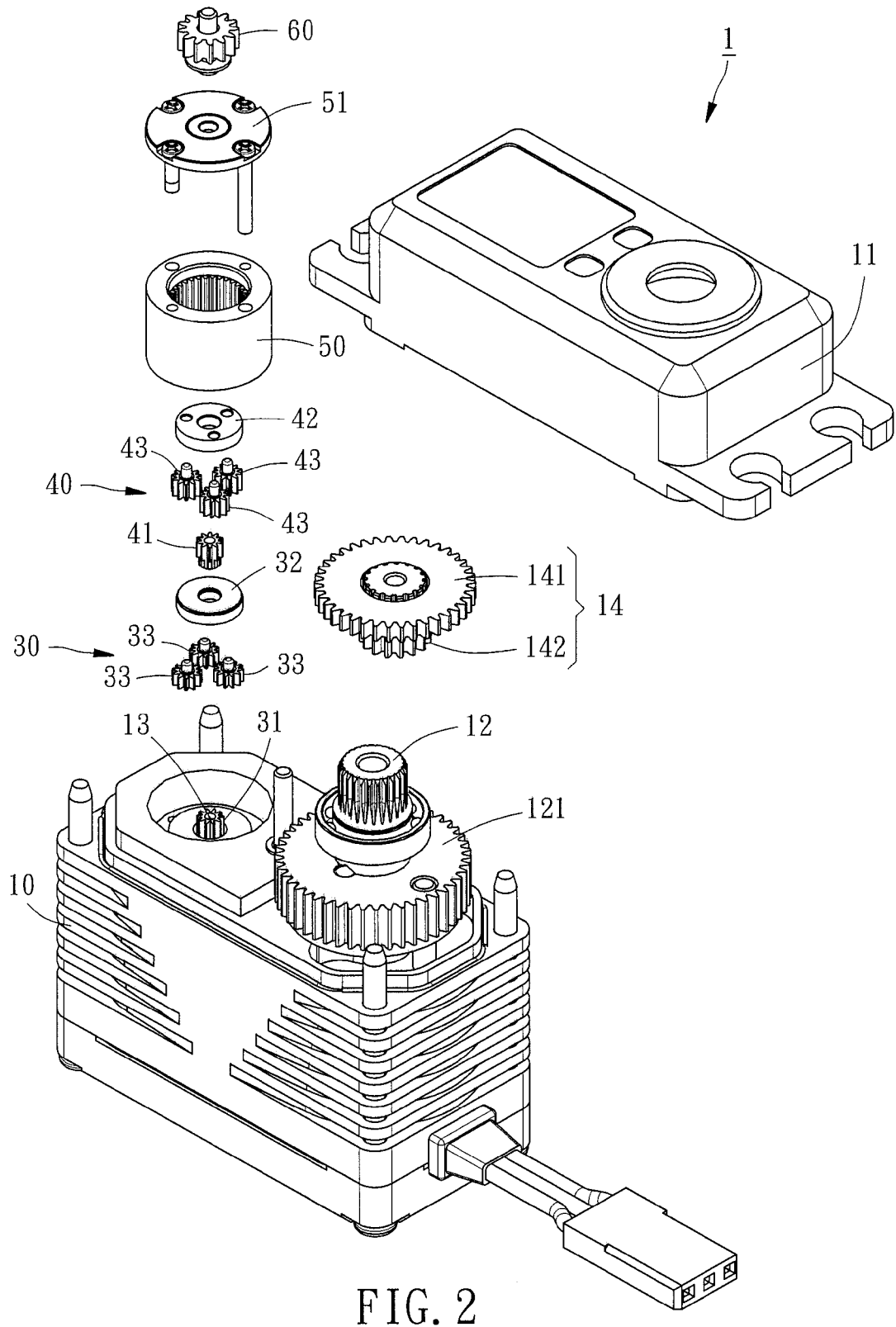
FIG. 2 is an exploded view of a speed reducer of the server according to FIG. 1.
Figure 3:
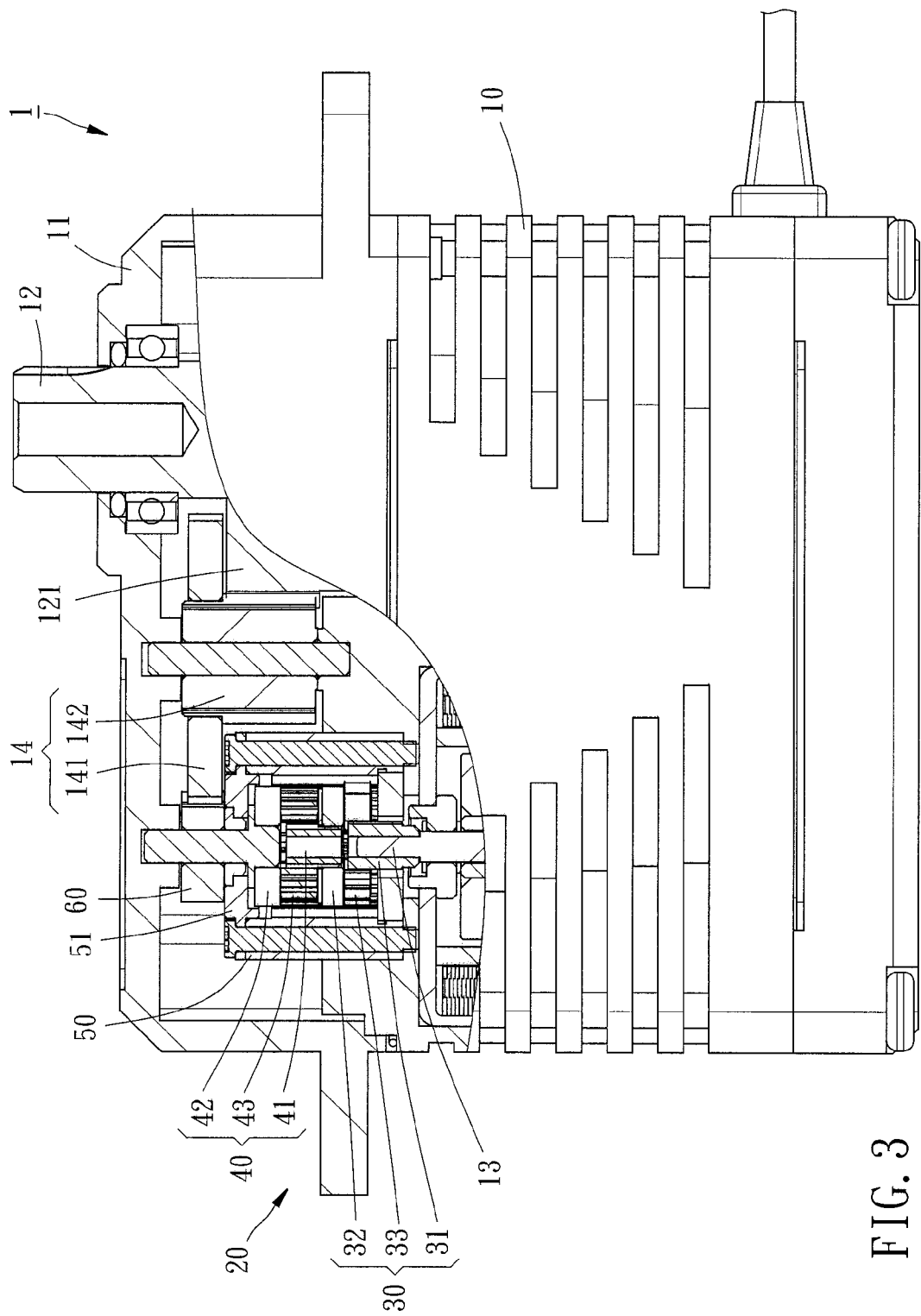
FIG. 3 is a partially cross-sectional profile of the server according to FIG. 1.

As illustrated in the annexed drawings of FIGS. 1-3, a server using a speed reducer according to the present invention is offered. For easy understanding of the present invention, a protruded direction of the power output shaft of the server is defined as the top side.

Referring to FIG. 1, a server 1 includes a housing 10, a top cover 11 covering a top side of the housing 10, and a power output shaft 12 exposing out of the top cover 11.

Referring to FIG. 2, the server 1 further includes a speed reducer 20 coupled between a motor output shaft 13, which suspends in the housing 10, and a stepped transmission gear 14, which pivotally couples at the top side of the housing 10. The stepped transmission gear 14 includes a large-diameter gear wheel 141, and a small-diameter gear wheel 142 being of a diameter smaller than that of the large-diameter gear wheel 141. The small-diameter gear wheel 142 meshes with an external gear 121 at the power output shaft 12. In other words, the stepped transmission gear 14 is advantageous to reduce the revolving speed of the power output shaft 12.

Referring to FIGS. 2 and 3 again, the aforesaid speed reducer 20 includes a first planetary gear set 30, a second planetary gear set 40, an internal gear 50 and an output gear 60. The first planetary gear set 30 is mounted to the internal gear 50, and includes a first sun gear 31 mounted on the motor output shaft 13 for synchronous rotation (in other words, the first sun gear 31 is the output gear of the motor), a first planet gear carrier 32, and three first planet gears 33 pivotally coupled at a bottom side of the first planet gear carrier 32. The first planet gears 33 are meshed with and driven by the first sun gear 31. When the motor output shaft 13 drives the first sun gear 31 to rotate, the first sun gear 31 consequentially drives the first planet gears 33 to rotate around the motor output shaft 13, and leads to rotate the first planet gear carrier 32.

Further, the second planetary gear set 40 includes a second sun gear 41, a second planet gear carrier 42, and three second planet gears 43. The second sun gear 41 is mounted at the first planet gear carrier 32 in a coaxial relationship with the motor output shaft 13. The second planet gears 43 are pivotally coupled at a bottom side of the second planet gear carrier 42 and meshed with the second sun gear 41.

The internal gear 50 is mounted at the top side of the housing 10 and covered with an outer cap 51. The internal gear 50 and the motor output shaft 13 are arranged in a coaxial manner. Furthermore, the internal gear 50 has internal gear teeth disposed an annular thereof. The internal gear 50 surrounds the first planetary gear set 30 and the second planetary gear set 40 by the internal gear teeth meshing with the second planet gears 43. When the first planet gear carrier 32 starts to rotate, it drives the second sun gear 41, resulting in the second planet gear 41 further rotating the second planet gear carrier 42 and the output gear 60.

The output gear 60 is mounted at a top side of the outer cap 51 of the internal gear 50 in a coaxial relationship with the motor output shaft 14 for synchronous rotation with the second planet gear carrier 42. Further, the output gear 60 is meshed with the large-diameter gear wheel 141 of the stepped transmission gear 14.

Thus, all of the first sun gear 31, the second sun gear 41, the internal gear 50 and the output gear 60 serve a coaxial relationship with the motor output shaft 13, by which the low backlash of the planet gear sets fully carries out and the backlash of the speed reducer 20 effectively reduces. Therefore, the product yield of the speed reducer 20 is improved and high speed reduction ratio in limited space is possible. According to the preferred embodiment, the speed reduction ratio of the speed reducer 20 can be as high as 36:1. Further, this embodiment provides great design capacity for designers. Further, compared to the prior art, a relatively simpler structure f the housing 10 according to the present invention facilitates fabrication to reduce the manufacturing cost.

When the motor output shaft 13 outputs a rotary driving force, the revolving speed of the rotary driving force is reduced by the first planetary gear set 30 and the second planetary gear set 40 and is delivered to the output gear 60 accurately. The output gear 60 would drive the stepped transmission gear 14 for output through the power output shaft 12, therefore the power transfer loss is reduced, the output torque of the server is increase and the service life of the speed reducer 20 is prolonged.

It should also be noted that the number of the aforesaid first planet gears and the number of the aforesaid second planet gears are not limited to 3, one single first planet gear and one simple second planet gear can function well. Furthermore, the invention can eliminate the second planetary gear set 40 and enable the first planet gear 32 of the first planetary gear set 30, and the first planet gear carrier 32 and the output gear 60 will be driven directly.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A speed reducer driven by a motor output shaft, comprising:
   a first planetary gear set including a first sun gear mounted on said motor output shaft, a first planet gear carrier, and at least one first planet gear pivotally coupled to said first planet gear carrier and meshed with said first sun gear;
   an internal gear surrounding said first planetary gear set and meshed with said first planet gear; and
   an output gear mounted at said internal gear and driven by said first planet gear carrier,
   wherein said speed reducer further includes a second planetary gear set; said second planetary gear set includes a second sun gear mounted at said first planet gear carrier in a coaxial relationship with said motor output shaft, a second planet gear carrier, and at least one second planet gear pivotally coupled at said second planet gear carrier; said second planet gear simultaneously meshes with said second sun gear and said internal gear.

2. The speed reducer as claimed in claim 1, wherein quantity of said first planet gear is 3.

3. The speed reducer as claimed in claim 1, wherein said output gear is mounted at a top side of said internal gear and remote from said motor output shaft; said output gear serves in a coaxial relationship with said motor output shaft.

4. The speed reducer as claimed in claim 3, wherein said internal gear includes an outer cap, and said output gear is mounted at the top side of said outer cap of said internal gear.

5. A server using a speed reducer, comprising a housing and a power output shaft; wherein
   the speed reducer driven by a motor output shaft comprises:
   a first planetary gear set including a first sun gear mounted on said motor output shaft, a first planet gear carrier, and at least one first planet gear pivotally coupled to said first planet gear carrier and meshed with said first sun gear;
   an internal gear surrounding said first planetary gear set and meshed with said first planet gear; and
   an output gear mounted at said internal gear and driven by said first planet gear carrier;
   said motor output shaft protrudes out of said housing; and
   said power output shaft is pivotally coupled in said housing; said speed reducer is coupled between said motor output shaft and said power output shaft for power transmission therebetween.

6. The server as claimed in claim 5, further including a stepped transmission gear pivotally coupled in said housing; said stepped transmission gear including a large-diameter gear wheel meshed with said output gear, and a small-diameter gear wheel meshed with an external gear disposed at said power output shaft.

7. The server as claimed in claim 6, wherein said speed reducer further includes a second planetary gear set; said second planetary gear set includes a second sun gear mounted at said first planet gear carrier in a coaxial relationship with said motor output shaft, a second planet gear carrier and at least one second planet gear pivotally coupled at said second planet gear carrier, said second planet gear simultaneously meshes with said second sun gear and said internal gear.

8. The server as claimed in claim 5, wherein said speed reducer further includes a second planetary gear set; said second planetary gear set includes a second sun gear mounted at said first planet gear carrier in a coaxial relationship with said motor output shaft, a second planet gear carrier and at least one second planet gear pivotally coupled at said second planet gear carrier, said second planet gear simultaneously meshes with said second sun gear and said internal gear.

9. The server as claimed in claim 8, wherein the quantity each of said first planet gear and said second planet gear is 3.

10. The server as claimed in claim 8, wherein said output gear is mounted at a top side of said internal gear and remote from said motor output shaft; said output gear serves in a coaxial relationship with said motor output shaft.

* * * * *